US012693673B2

(12) United States Patent
Masuda

(10) Patent No.: US 12,693,673 B2
(45) Date of Patent: Jul. 28, 2026

(54) VEHICLE REMOTE OPERATION APPARATUS, VEHICLE REMOTE OPERATION METHOD, AND COMPUTER READABLE STORAGE MEDIUM

(71) Applicant: HONDA MOTOR CO., LTD., Tokyo (JP)

(72) Inventor: Takuro Masuda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 245 days.

(21) Appl. No.: 18/442,109

(22) Filed: Feb. 15, 2024

(65) Prior Publication Data

US 2024/0329647 A1 Oct. 3, 2024

(30) Foreign Application Priority Data

Mar. 31, 2023 (JP) ................................. 2023-058205

(51) Int. Cl.
*G05D 1/225* (2024.01)
(52) U.S. Cl.
CPC .................................... *G05D 1/225* (2024.01)
(58) Field of Classification Search
None
See application file for complete search history.

(56) References Cited

U.S. PATENT DOCUMENTS

2021/0072744 A1 3/2021 Urano

FOREIGN PATENT DOCUMENTS

| JP | 2007164431 A | * | 6/2007 |
| JP | 2014043212 A | | 3/2014 |
| JP | 2021043524 A | | 3/2021 |

OTHER PUBLICATIONS

Office Action issued for counterpart Japanese Application No. 2023-058205, transmitted from the Japanese Patent Office on Jan. 14, 2025 (drafted on Jan. 8, 2025).

* cited by examiner

*Primary Examiner* — Michael D Lang

(57) ABSTRACT
A vehicle remote operation apparatus comprises: a location acquisition unit which acquires location information indicating a location of a vehicle; a remote operation unit which, in response to a remote operation request from a user terminal associated with the vehicle, causes the vehicle to perform an operation requested by the remote operation request; and a transmission unit which, when the location acquisition unit acquires a location information of a first vehicle, transmits, to a user terminal associated with the first vehicle, information related to an operation of a second vehicle that has been performed in response to a remote operation request from a user terminal associated with the second vehicle in a predetermined range including a location of the first vehicle.

11 Claims, 10 Drawing Sheets

| VEHICLE ID | FUNCTIONAL INFORMATION | USER INFORMATION |
|:---:|:---:|:---:|
| ID1 | FUNCTIONAL INFORMATION 1 | USER INFORMATION 1 |
| ID2 | FUNCTIONAL INFORMATION 2 | USER INFORMATION 2 |
| ID3 | FUNCTIONAL INFORMATION 3 | USER INFORMATION 3 |
| . . . | . . . | . . . |

*FIG.4*

| VEHICLE ID | DATE-AND-TIME INFORMATION | LOCATION INFORMATION | STATE INFORMATION |
|---|---|---|---|
| ID1 | DATE-AND-TIME 1 | LOCATION INFORMATION 1 | TRAVELING |
| ID1 | DATE-AND-TIME 2 | LOCATION INFORMATION 2 | TRAVELING |
| ID1 | DATE-AND-TIME 3 | LOCATION INFORMATION 3 | IG OFF |
| . . . | . . . | . . . | . . . |

*FIG.5*

| VEHICLE ID | LOCATION INFORMATION | OPERATION INFORMATION | VEHICLE ENVIRONMENTAL INFORMATION | PERFORMANCE DATE-AND-TIME INFORMATION | DEGREE OF RECOMMENDATION |
|---|---|---|---|---|---|
| ID1 | LOCATION INFORMATION 1 | HEATER ON | ENVIRONMENTAL INFORMATION 1 | DATE-AND-TIME 1 | DEGREE OF RECOMMENDATION 1 |
| ID2 | LOCATION INFORMATION 2 | DEFROSTER ON | ENVIRONMENTAL INFORMATION 2 | DATE-AND-TIME 2 | DEGREE OF RECOMMENDATION 2 |
| ID3 | LOCATION INFORMATION 3 | REMOTE PARKING | ENVIRONMENTAL INFORMATION 3 | DATE-AND-TIME 3 | DEGREE OF RECOMMENDATION 3 |
| . . . | . . . | . . . | | . . . | . . . |

FIG.6

| OPERATION INFORMATION | RELATED RECOMMENDATION INFORMATION |
|---|---|
| HEATER ON | DEFROSTER ON |
| HEATER ON | INDOOR ACTIVITY RECOMMENDED |
| REMOTE PARKING | USE OF ANOTHER PARKING LOT RECOMMENDED |
| ⋮ | ⋮ |

FIG.7

VEHICLE REMOTE OPERATION APPARATUS, VEHICLE REMOTE OPERATION METHOD, AND COMPUTER READABLE STORAGE MEDIUM

BACKGROUND

1. Technical Field

The present invention relates to a vehicle remote operation apparatus, vehicle remote operation method, and computer readable storage medium.

2. Related Art

Patent document 1 describes a system for providing to a self-driving vehicle a remote instruction to control the self-driving vehicle.

PRIOR ART DOCUMENT

Patent Document

Patent Document 1: Japanese Patent Application Publication No. 2021-43524

BRIEF DESCRIPTION OF THE DRAWINGS

FIG. 4 shows an exemplary data structure of vehicle-specific information stored in a storage device 290.

FIG. 5 shows an exemplary data structure of usage history information of a vehicle stored in the storage device 290.

FIG. 6 shows an exemplary data structure of remote operation history information stored in the storage device 290.

FIG. 7 shows an exemplary data structure of operation-related recommendation information stored in the storage device 290.

DESCRIPTION OF EXEMPLARY EMBODIMENTS

Hereinafter, the present invention will be described through embodiments of the invention, but the following embodiments do not limit the invention according to claims. In addition, not all combinations of features described in the embodiment are essential to the solution of the invention.

Figure 1:
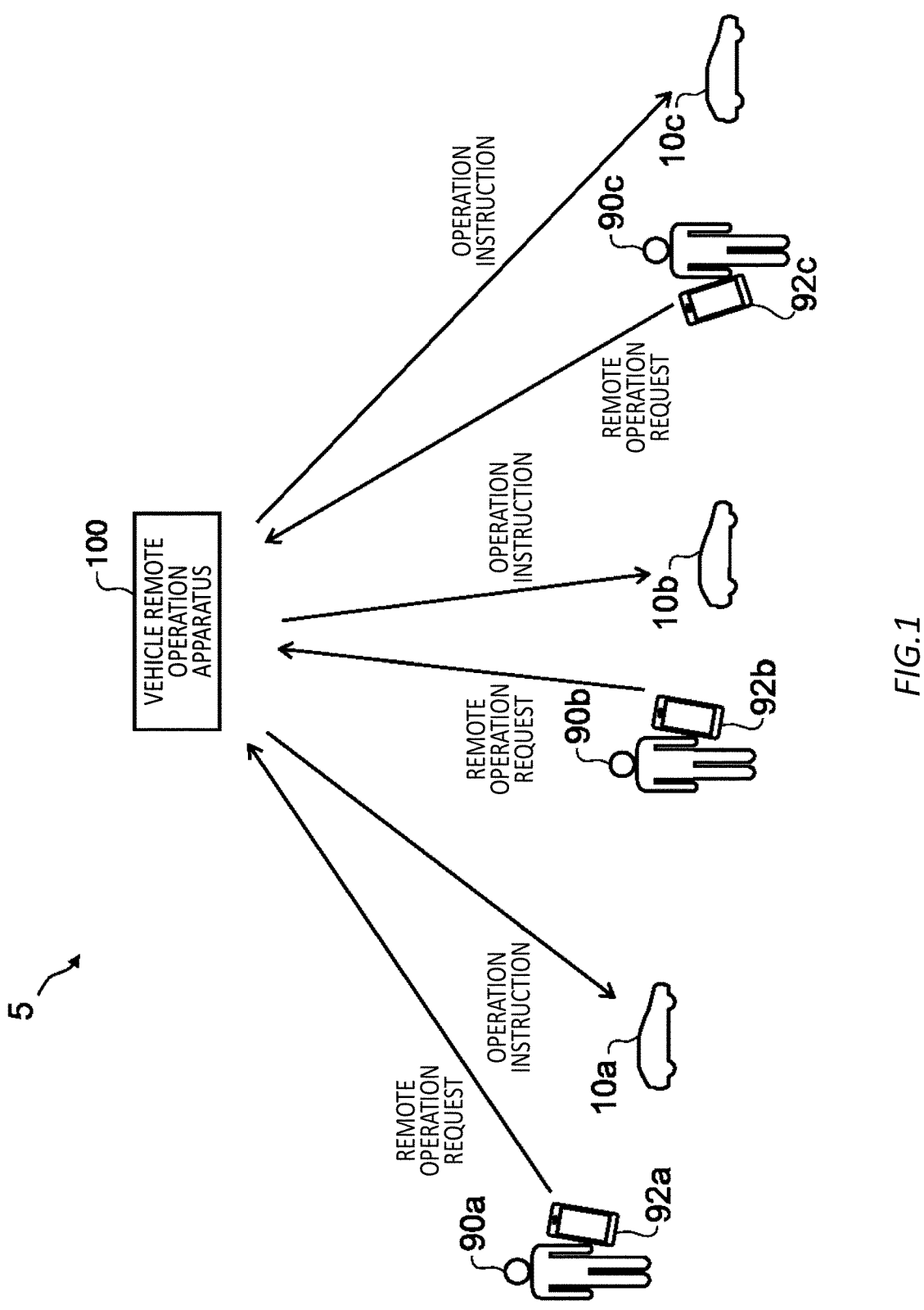
FIG. 1 conceptually shows how a vehicle remote operation system 5 is utilized in one embodiment.

FIG. 1 conceptually shows how a vehicle remote operation system 5 is utilized in one embodiment. The vehicle remote operation system 5 includes a vehicle remote operation apparatus 100 and a plurality of vehicles including a vehicle 10a, a vehicle 10b, and a vehicle 10c.

In the present embodiment, each of the vehicle 10a, the vehicle 10b, and the vehicle 10c is one example of a movable object. For example, the vehicle 10a, the vehicle 10b, and the vehicle 10c are automobiles such as electric vehicles, hybrid vehicles, or fuel battery vehicles. In the present embodiment, the plurality of vehicles including the vehicle 10a, the vehicle 10b, and the vehicle 10c may be collectively referred to as a "vehicle 10".

The vehicle remote operation apparatus 100 can communicate with the vehicle 10 and a user terminal 92. For example, the vehicle remote operation apparatus 100 can communicate with the vehicle 10 and the user terminal 92 through a mobile communication network.

The vehicle 10 regularly transmits, to the vehicle remote operation apparatus 100 directly or indirectly, vehicle information acquired in the vehicle 10 during traveling. The vehicle information includes, for example, current location information, vehicle speed information or the like of the vehicle 10. The vehicle 10 transmits, to the vehicle remote operation apparatus 100, vehicle environmental information acquired in the vehicle 10 during traveling and while stopped. The vehicle environmental information includes temperature and humidity inside the vehicle 10 and an outside air temperature external to the vehicle 10. The vehicle remote operation apparatus 100 may transmit, to the vehicle 10, request information for requesting transmission of the vehicle environmental information, and the vehicle 10 may transmit the vehicle environmental information to the vehicle remote operation apparatus 100 when the request information from the vehicle remote operation apparatus 100 is received. The vehicle remote operation apparatus 100 stores the vehicle information and the vehicle environmental information received from the vehicle 10.

The vehicle remote operation apparatus 100 can acquire past and future weather information in areas where the vehicle 10 exists based on weather information collected from an external weather information server. The weather information includes temperature, humidity, wind direction, wind speed, or the like.

The user terminal 92a is a user terminal owned by a user 90a of the vehicle 10a. The user terminal 92b is a user terminal owned by a user 90b of the vehicle 10b. The user terminal 92c is a user terminal owned by a user 90c of the vehicle 10c. In the present embodiment, the user 90a, the user 90b, and the user 90c may be collectively referred to as a "user 90". In the present embodiment, the user terminal 92a, the user terminal 92b, and the user terminal 92c may be collectively referred to as a "user terminal 92". The user terminal 92 is, for example, a smartphone. The user terminal 92 may be a portable terminal other than a smartphone. The user terminal 92 may be a computing device having a communication function. The user terminal 92 may be a terminal such as a mobile phone, PDA (registered trademark), tablet computer, notebook computer, laptop computer, or wearable computer.

The user 90 can remotely operate the vehicle 10 through the user terminal 92 and the vehicle remote operation apparatus 100. For example, in winter, when the user 90 is going to raise the internal temperature of the vehicle 10 before getting on the vehicle 10, the user 90 performs operation on the user terminal 92 to activate the air conditioner on the vehicle 10 in advance. The user terminal 92 transmits, to a vehicle remote operation apparatus 100, a remote operation request for requesting a heating operation of the air conditioner in response to the user operation. On receiving the remote operation request, the vehicle remote operation apparatus 100 transmits an operation instruction giving instruction of the heating operation of the air conditioner, to the vehicle 10 correspondingly related to the user terminal 92 that originally transmitted the remote operation request, and thus cause the heating operation of the air conditioner in the vehicle 10 to be performed. The vehicle remote operation apparatus 100 stores the remote operation information indicating the remote operation that has been requested by the user terminal 92, along with the location of the vehicle 10. By doing so, the vehicle remote operation apparatus 100 can correspondingly relate the remote operation information indicating the remote operation that has been requested by the user 90 to the location of the vehicle 10, to accumulate the information.

Figure 2:
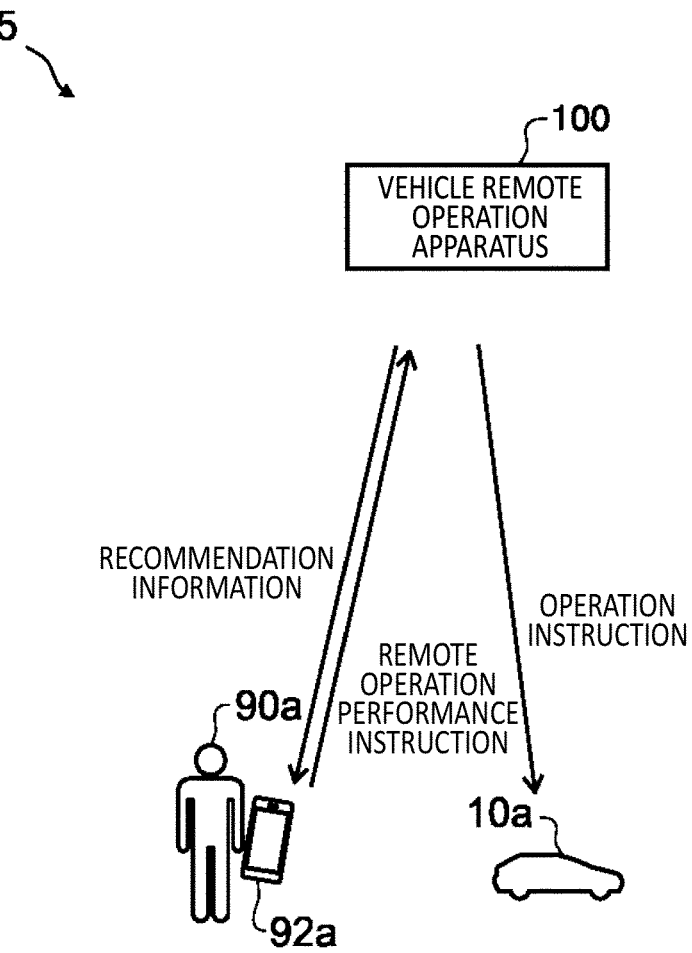
FIG. 2 is a drawing to describe how a vehicle remote operation apparatus 100 performs recommendations to a user 90 based on remote operation information.

FIG. 2 describes how the vehicle remote operation apparatus 100 performs recommendations to a user 90 based on the remote operation information. Here, the situation in which the vehicle remote operation apparatus 100 performs recommendation to the user 90a will be described. When the vehicle 10a stops, it transmits the location information at a point in time of the stop to the vehicle remote operation apparatus 100.

The vehicle remote operation apparatus 100 refers to remote operation information and weather information, and extract a plurality of remote operations that have been performed in the past on one or more vehicles 10 in the environment that matches the vehicle environment of the stopped vehicle 10a and the weather information as well as in a predetermined range including the stopped location of the vehicle 10a. The vehicle remote operation apparatus 100 transmits recommendation information to the user terminal 92 based on the extracted plurality of remote operations. For example, if the number of vehicles 10 for which heating operation of the air conditioner is requested by remote operation in the environment that matches the internal and/or external environment of the vehicle 10a as well as in the predetermined range including the stopped location of the vehicle 10a exceeds a predetermined number, the vehicle remote operation apparatus 100 transmits, to the user terminal 92a, the recommendation information indicating that the heating operation of the air conditioner in the vehicle 10a is recommended. When the user 90a performs, on the user terminal 92a, the instruction operation to perform the heating operation of the air conditioner in accordance with the recommendation information received by the user terminal 92a, the user terminal 92a transmits, to the vehicle remote operation apparatus 100, a remote operation performance instruction to perform heating operation of the air conditioner. When the vehicle remote operation apparatus 100 receives the remote operation performance instruction from the user terminal 92a, it transmits, to the vehicle 10a, an operation instruction giving instruction of the heating operation of the air conditioner, thereby causing the heating operation of the air conditioner in the vehicle 10a to be performed.

According to the vehicle remote operation system 5, for example, when the user 90a is in a region and/or in the environment where heating the interior of the vehicle 10 is desired, the user 90a can cause the heating operation of the air conditioner in the vehicle 10a to be performed. By doing so, the user 90a can spend time comfortably when getting on the vehicle 10a. For example, when the user 90a visits a region for the first time, the user 90a may not know whether the remote operation of the air conditioner or the like in the vehicle 10a is desired. According to the vehicle remote operation system 5, a recommendation can be made to the user 90a to perform the remote operation of the air conditioner or the like if the remote operation of the air conditioner or the like has been frequently performed in the past in the region.

Figure 3:
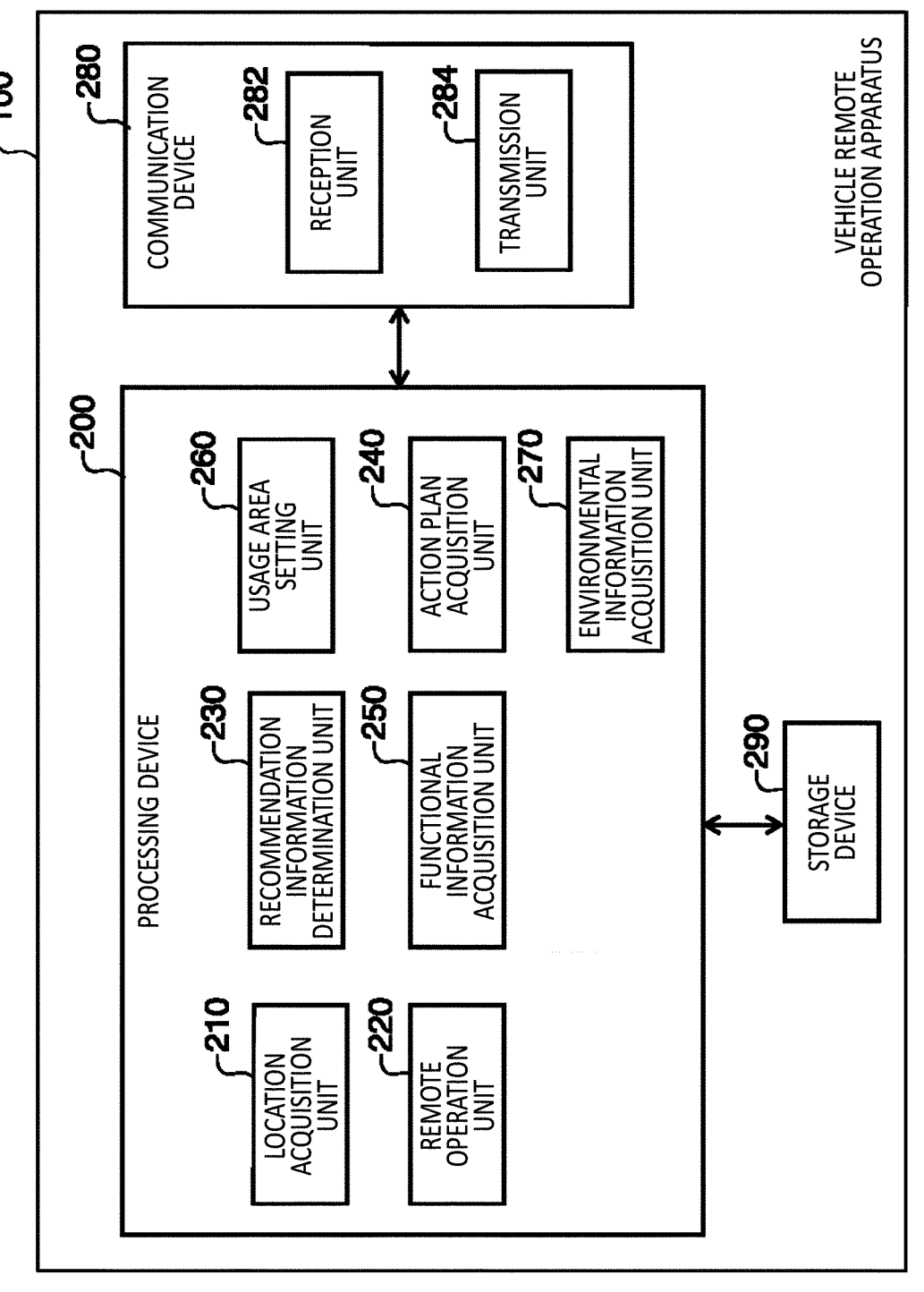
FIG. 3 shows a functional configuration included in the vehicle remote operation apparatus 100.

FIG. 3 shows a functional configuration included in the vehicle remote operation apparatus 100. The vehicle remote operation apparatus 100 includes a processing device 200, a communication device 280, and a storage device 290. The vehicle remote operation apparatus 100 may be implemented by one or more computers.

The communication device 280 is responsible for communication with the vehicle 10. The communication device 280 includes a reception unit 282 and a transmission unit 284.

The storage device 290 stores information used in the vehicle remote operation apparatus 100. The storage device 290 may be implemented by a nonvolatile storage medium.

The processing device 200 includes a location acquisition unit 210, a remote operation unit 220, a recommendation information determination unit 230, an action plan acquisition unit 240, a functional information acquisition unit 250, a usage area setting unit 260, and an environmental information acquisition unit 270.

The location acquisition unit 210 acquires location information indicating a location of the vehicle 10. The remote operation unit 220 causes the vehicle 10 to perform an operation requested by the remote operation request in response to the remote operation request from the user terminal 92 associated with the vehicle 10. When the location acquisition unit 210 acquires the location information of a first vehicle 10, the transmission unit 284 transmits, to a user terminal 92 associated with the first vehicle 10, information related to an operation of a second vehicle 10 that has been performed in response to a remote operation request from a user terminal 92 associated with the second vehicle 10 in a predetermined range including the location of the first vehicle 10. Specifically, when the location acquisition unit 210 acquires the location information of the first vehicle 10, the recommendation information determination unit 230 determines the information related to the operation of the second vehicle 10 that has been performed in response to the remote operation request from the user terminal 92 associated with the second vehicle 10 in the predetermined range including the location of the first vehicle 10, to be the recommendation information, and the transmission unit 284 transmits, to the user terminal 92, the recommendation information determined by the recommendation information determination unit 230.

By doing so, the information related to the remote operation that has been performed around the location of the vehicle 10 can be provided to the user 90. Therefore, for example, when the user 90 visits a cold region by the vehicle 10 for the first time, it is possible to provide the recommendation information for operating the heater or the like before getting on the vehicle 10. Thus, the user 90 can spend time comfortably when getting on the vehicle 10.

The location acquisition unit 210 acquires location information which indicates a stopped location of the vehicle 10. When the vehicle 10 is stopped, the remote operation unit 220 causes the vehicle 10 to perform the operation requested by the remote operation request received from the user terminal 92. By employing the configuration in which the location acquisition unit 210 acquires the stopped location of the vehicle 10, the communication capacity can be reduced compared to the configuration in which the location information is consecutively received even while the vehicle 10 is traveling.

When the location acquisition unit 210 acquires the location information of the first vehicle 10, the transmission unit 284 transmits, to the user terminal 92 associated with the first vehicle 10, information related to operations of a plurality of second vehicles 10 that have been performed in response to a plurality of remote operation requests in a predetermined period before the first vehicle 10 is stopped as well as in a predetermined range including the stopped location of the first vehicle 10. By doing so, the recommendation information can be determined based on the plurality of vehicles 10 and the plurality of pieces of remote operation data, allowing provision of more effective recommendation information.

The action plan acquisition unit 240 acquires an action plan of the user 90 of the first vehicle 10. The "predetermined range" may be determined in accordance with the action plan. By doing so, when actions of the user 90 are planned, the vehicle remote operation apparatus 100 can provide the user 90 with the recommendation information based on the remote operation that has been performed by other vehicle 10 in the past in the range which includes the destination of the vehicle 10. The action plan acquisition unit 240 may acquire the destination information from a navigation system included in the vehicle 10. The action plan acquisition unit 240 may acquire schedule information registered in a schedule management server or the user terminal 92 by the user 90. The action plan acquisition unit 240 may acquire the action plan of the user 90 based on the past usage history of the vehicle 10 by the user 90. For example, when it is determined that the vehicle 10 is regularly used based on the usage history of the vehicle 10, the action plan acquisition unit 240 may determine that the vehicle 10 is regularly used for commuting or picking-up and dropping-off or the like, and may determine the time when the user 90 will use the vehicle 10 in the future based on the regular usage time of the vehicle 10.

The environmental information acquisition unit 270 acquires environmental information that indicates the environment at the location of the vehicle 10. The environmental information acquisition unit 270 may acquire, as the environmental information, weather information collected from an external weather information server. The environmental information acquisition unit 270 may acquire, as the vehicle environmental information, environmental information inside or outside of the vehicle detected in the vehicle 10. The transmission unit 284 may transmit, to the user terminal 92 associated with the first vehicle 10, the information related to the operation of the second vehicle 10 that has been performed in response to the remote operation request in an environment related to the environmental information at a time related to the action plan and at the location of the first vehicle 10 as well as in the predetermined range including the stopped location of the first vehicle 10. The environmental information includes temperature, humidity, weather, wind speed, wind direction, or the like. By doing so, the recommendation information according to the environment of the vehicle 10 used by the user 90 can be provided.

The functional information acquisition unit 250 acquires functional information that indicates a function included in the vehicle 10. The transmission unit 284 may transmit, to the user terminal 92 associated with the first vehicle 10, information related to the operation of the second vehicle 10 that has a function related to the function included in the first vehicle 10, that has been performed in response to the remote operation request in a predetermined range including a stopped location of the first vehicle 10. By doing so, the recommendation information that suits the function included in the vehicle 10 of the user 90 can be provided. The functional information may include, for example, information indicating whether the vehicle 10 is an electric vehicle, a hybrid vehicle, or an engine vehicle provided with an internal combustion engine, or the like. When the vehicle 10 is an electric vehicle or a plug-in hybrid vehicle, the functional information may include remaining-charge information of the battery included in the vehicle 10, and if the remaining-charge information of the battery included in the vehicle 10 becomes lower than a predetermined value, the recommendation information determination unit 230 can avoid recommendation of the operations that consume more electric power than a predetermined value when determining the recommendation information.

The usage area setting unit 260 sets a usage area in which the first vehicle 10 is mainly used based on the usage history including the location information of the first vehicle 10 in a predetermined period and the frequency of the first vehicle 10 being present at the location indicated by the location information. For example, the usage area setting unit 260 set a predetermined range (for example, within a 10 km radius around the location) including a location where the first vehicle 10 has passed through more frequently than a predetermined number of times in a predetermined period (for example, three years), as a usage area mainly used. When the location acquisition unit 210 acquires the location information of the first vehicle 10, on condition that the location indicated by the location information of the first vehicle 10 is outside the usage area, the transmission unit 284 transmits, to the user terminal 92 associated with the first vehicle 10, information related to the operation of the second vehicle 10 that has been performed in response to the remote operation request from the user terminal 92 associated with the second vehicle 10 in the predetermined range including the location of the first vehicle 10. By doing so, the recommendation information can be provided in the region where the user 90 visits for the first time by the vehicle 10, and the recommendation information can be suppressed in the region where the user 90 frequently uses the vehicle 10.

FIG. 4 shows an exemplary data structure of vehicle-specific information stored in a storage device 290. The vehicle-specific information provides a corresponding relationship among vehicle ID, functional information, and user information.

The vehicle ID is identification information of the vehicle 10. The functional information includes information indicating the function of the vehicle 10. The functional information includes driving source information indicating a type of driving source of the vehicle 10. The driving source information may include, for example, information indicating whether the vehicle 10 is an electric vehicle, a hybrid vehicle, a fuel battery vehicle, or an engine vehicle. The functional information may include state information of an energy source. The state information of the energy source may include information to indicate remaining charge of a battery. The functional information may include size information. The size information may include, for example, information to indicate a volume of an internal space of the vehicle 10 or information to indicate an external size of the vehicle 10, or the like. In addition, the functional information may include information related to the selection or performance of the remote operation such as whether a remote parking function is included or not.

The user information may include identification information of the user terminal 92, identification information of the user 90, action schedule information of the user 90, or the like. The action schedule information of the user 90 may include information acquired from a navigation system included in the vehicle 10 or a schedule management server that manages the schedule of the user 90. The action schedule information of the user 90 may include regular action information of the user 90 that is presumed from the usage history of the vehicle 10.

FIG. 5 shows an exemplary data structure of usage history information of a vehicle stored in the storage device 290. The usage history information provides a corresponding relationship among vehicle ID, date-and-time information, location information, and state information.

The vehicle ID is identification information of the vehicle 10. The date-and-time information indicates date and time indicating when information is acquired in the vehicle 10.

The location information indicates a current location of the vehicle 10. For example, the location information indicates the latitude and longitude of the current location of the vehicle 10. The latitude and longitude of the current location of the vehicle 10 are detected in the vehicle 10 by the GNSS receiver included in the vehicle 10 receiving signals from the GNSS satellite.

The state information indicates a state of the vehicle 10. The state of the vehicle 10 includes information indicating that, for example, it is traveling, stopped, ignition (IG) is off, or the like. The vehicle remote operation apparatus 100 acquires, from the vehicle 10, the information indicating the state of the vehicle. The location information which corresponds to the IG off may be used as the location information indicating the stopped location of the vehicle 10.

The action plan acquisition unit 240 may presume regular action of the user 90 based on the usage history information, and generate the action plan based on the presumed regular action. The regular action of the user 90 may include, for example, information indicating a regular start time of usage of the vehicle 10. The regular start time of usage of the vehicle 10 may be, for example, the time of departure by the vehicle 10 on weekdays or the like.

FIG. 6 shows an exemplary data structure of remote operation history information stored in the storage device 290. The remote operation history information provides a corresponding relationship among the vehicle ID, the location information, the operation information, the vehicle environmental information, the performance date-and-time information, and a degree of recommendation.

The vehicle ID is identification information of the vehicle 10. The location information indicates a location of the vehicle 10 at the time when the remote operation is performed. For example, the location information indicates the latitude and longitude of the location of the vehicle 10 at the time when the remote operation is performed.

The operation information is information indicating a type of remote operation. For example, the operation information is "heater ON" to activate a heater, "defroster ON" to activate a defroster, "defogger ON" to activate a defogger, "remote parking" to assist parking of the vehicle 10 from outside the vehicle 10 through the user terminal 92, or the like, and so on.

The vehicle environmental information indicates the vehicle's internal temperature, internal humidity, external temperature, external humidity, and the like acquired in the vehicle 10. The performance date-and-time information indicates the date and time of when the remote operation was performed on the vehicle 10. The degree of recommendation indicates how much the operation indicated by the corresponding operation information is recommended.

FIG. 7 shows an exemplary data structure of operation-related recommendation information stored in the storage device 290. The operation-related recommendation information provides a corresponding relationship between the operation information and the related recommendation information. The operation information is information indicating a type of remote operation, as described in connection with FIG. 6.

The related recommendation information is information that may be recommended by the vehicle remote operation apparatus 100 in connection with the remote operation. For example, as shown in FIG. 7, "defroster ON" and "indoor activity recommended" are correspondingly related to "heater ON". If the remote operation of "heater ON" has been requested for many vehicles 10 in the past, the region is predicted to be a low-temperature region. Accordingly, for the user 90 of the vehicle 10 that is stopped in such a region, an operation to activate a defroster of the vehicle 10 or indoor activity can be recommended in addition to the recommendation of operation to turn on a heater of the vehicle 10.

Similarly, "use of another parking lot recommended" is correspondingly related to "remote parking" in the operation-related recommendation information. If the remote operation for "remote parking" has been requested for many vehicles 10 at a certain location in the past, the location is predicted to be a narrow parking space. Accordingly, for the user 90 of the vehicle 10 that is stopped at such a location, the recommendation to use another parking lot can be made in addition to the recommendation of remote parking. In this manner, the related recommendation information may include recommendation information relating to an action of the user in addition to the recommendation information of the remote operation of the vehicle 10.

Figure 8:
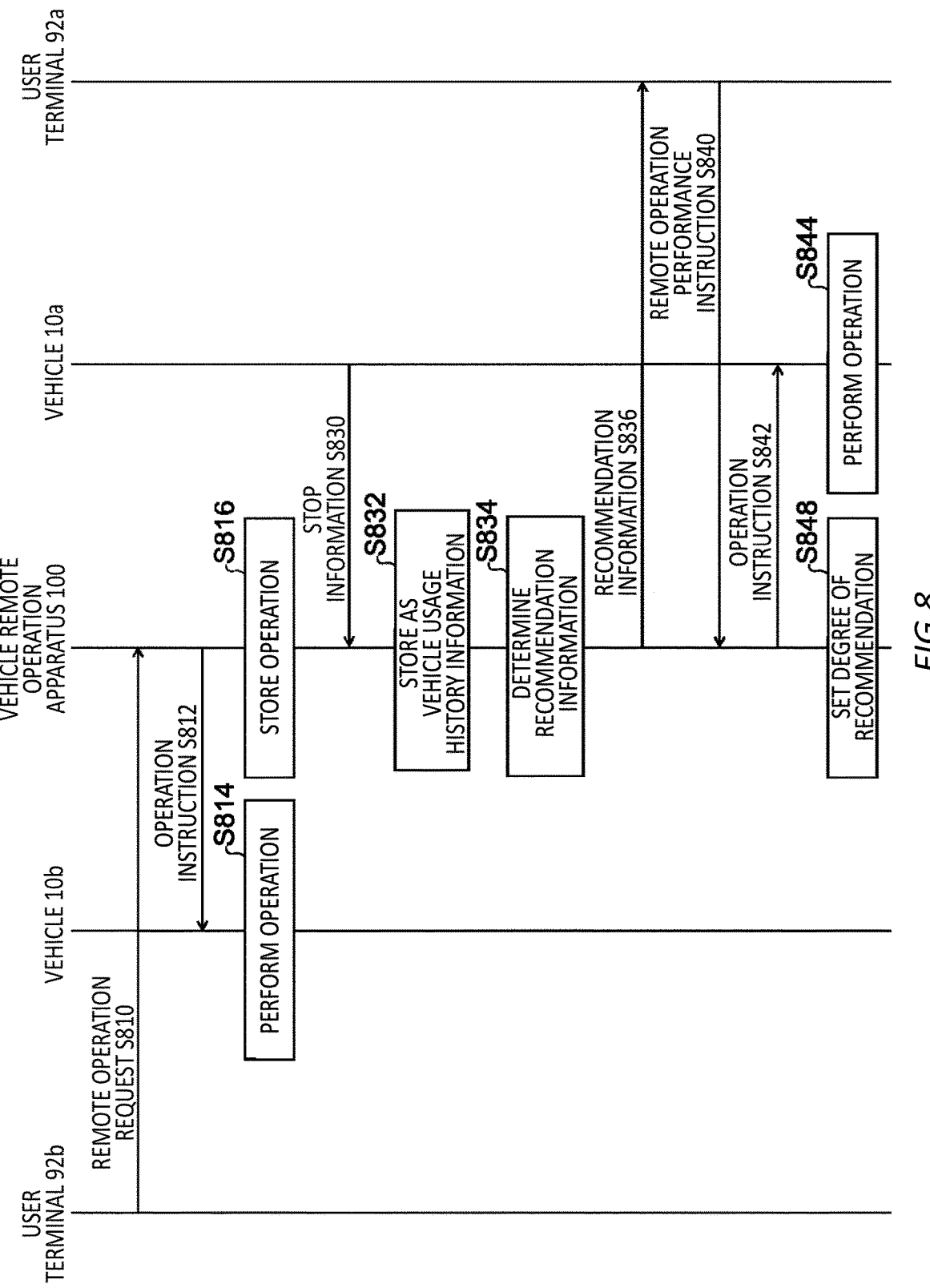
FIG. 8 shows schematic processing performed in a user terminal 92, a vehicle 10, and the vehicle remote operation apparatus 100.

FIG. 8 shows schematic processing performed in the user terminal 92, the vehicle 10, and the vehicle remote operation apparatus 100. For the purpose of easily understandable explanation, FIG. 8 shows operations that are performed by a user terminal 92*b* and a vehicle 10*b*, a user terminal 92*a* and a vehicle 10*a*, and the vehicle remote operation apparatus 100.

In S810, the user terminal 92*b* transmits, to the vehicle remote operation apparatus 100 in response to the user operation by the user 90*b*, a remote operation request indicating the operation requested by the user 90*b*. When the reception unit 282 receives the remote operation request transmitted from the user terminal 92*b*, the vehicle remote operation apparatus 100 transmits, to the vehicle 10*b*, the operation instruction to perform the operation requested by the remote operation request (S812).

In S814, the vehicle 10*b* performs the instructed operation in accordance with the operation instruction received from the vehicle remote operation apparatus 100. When the operation is performed in the vehicle 10*b*, the storage device 290 of the vehicle remote operation apparatus 100 stores, in the remote operation history information, the operation information indicating the operation instructed to the vehicle 10*b* along with the vehicle ID of the vehicle 10*b*, the location information of the vehicle 10*b*, the vehicle environmental information of the vehicle 10*b* and the date-and-time information (S816).

Subsequently, when the vehicle 10*a* is stopped and the operation to turn off the IG (ignition) power supply is performed, the vehicle 10*a* transmits, to the vehicle remote operation apparatus 100, the stop information indicating that the vehicle 10*a* is stopped (S830). The stop information includes information indicating the current location of the vehicle 10a. When the reception unit 282 receives the stop information, the location acquisition unit 210 extracts the location information of the vehicle 10 from the stop information, and the storage device 290 stores, as the vehicle usage history information, the extracted location information along with the vehicle ID of the vehicle 10a, the current date-and-time information, and the state information indicating the IG off.

In S834, when the recommendation information determination unit 230 determines to make a recommendation to the user 90a based on the remote operation history, it determines the recommendation information. For example, the recommendation information determination unit 230 may determine to make a recommendation to the user 90a based on the remote operation history, if there is a predetermined amount of time before the scheduled time of action of the user 90a based on the action plan of the user 90a acquired by the action plan acquisition unit 240 as well as if the internal and/or external environmental information of the vehicle 10a including the weather information of a region that includes the current vehicle environment and the location of the vehicle 10a satisfies predetermined conditions. The predetermined conditions may include conditions related to, for example, the vehicle's internal temperature and/or external outside air temperature. The predetermined conditions related to the vehicle's internal temperature or external outside air temperature may include that the vehicle's internal temperature and/or outside air temperature becomes equal to or lower than a predetermined threshold. The predetermined conditions related to the vehicle's internal temperature or external outside air temperature may include that the vehicle's internal temperature and/or external outside air temperature becomes equal to or higher than a predetermined threshold. The predetermined conditions may include, for example, conditions related to the vehicle's internal humidity and/or external outside air humidity, in addition to conditions related to the vehicle's internal temperature and/or external outside air temperature.

When determining the recommendation information, the recommendation information determination unit 230 refers to the remote operation history information to extract the operation information of the operation that has been performed in response to the remote operation request in the past on a vehicle 10 having the functional information that matches the functional information of the vehicle 10a in the environmental information that matches the internal and/or external environmental information of the vehicle 10a, as well as in the predetermined geographical range that includes the location of the vehicle 10a received in S830. Furthermore, the recommendation information determination unit 230 refers to the operation-related recommendation information to select the related recommendation information correspondingly related to the extracted operation information. The recommendation information determination unit 230 determines one or more pieces of recommendation information from among the recommendation information indicating the operation indicated by the extracted operation information, and/or the related recommendation information selected from the operation-related recommendation information, to be the recommendation information that is recommended to the user 90a. In doing so, the recommendation information determination unit 230 may preferentially determine the recommendation information that is based on the operation information correspondingly related to a higher degree of recommendation in the remote operation history information, to be the recommendation information that is recommended to the user 90a.

In S836, the transmission unit 284 transmits, to the user terminal 92a, the recommendation information determined in S834 by the recommendation information determination unit 230. When an instruction is made by the user 90a to perform an operation of the vehicle 10a, the user terminal 92a transmits, to the vehicle remote operation apparatus 100, the remote operation performance instruction to perform said operation (S840).

When the reception unit 282 in the vehicle remote operation apparatus 100 receives the remote operation performance instruction transmitted from the user terminal 92a, the vehicle remote operation apparatus 100 transmits, to the vehicle 10a, the operation instruction to perform the operation instructed by the remote operation performance instruction (S842).

In S844, the vehicle 10a performs the instructed operation in accordance with the operation instruction received from the vehicle remote operation apparatus 100. In S848, when the reception unit 282 receives the response information indicating that the operation instructed to the vehicle 10a has been performed in the vehicle 10a, the storage device 290 in the vehicle remote operation apparatus 100 sets a degree of recommendation of the remote operation history information (S848). Specifically, a higher degree of recommendation is set for the operation information that corresponds to the operation instructed to and performed in the vehicle 10a among pieces of operation information extracted from the remote operation history information when determining the recommendation information in S834.

Figure 9:
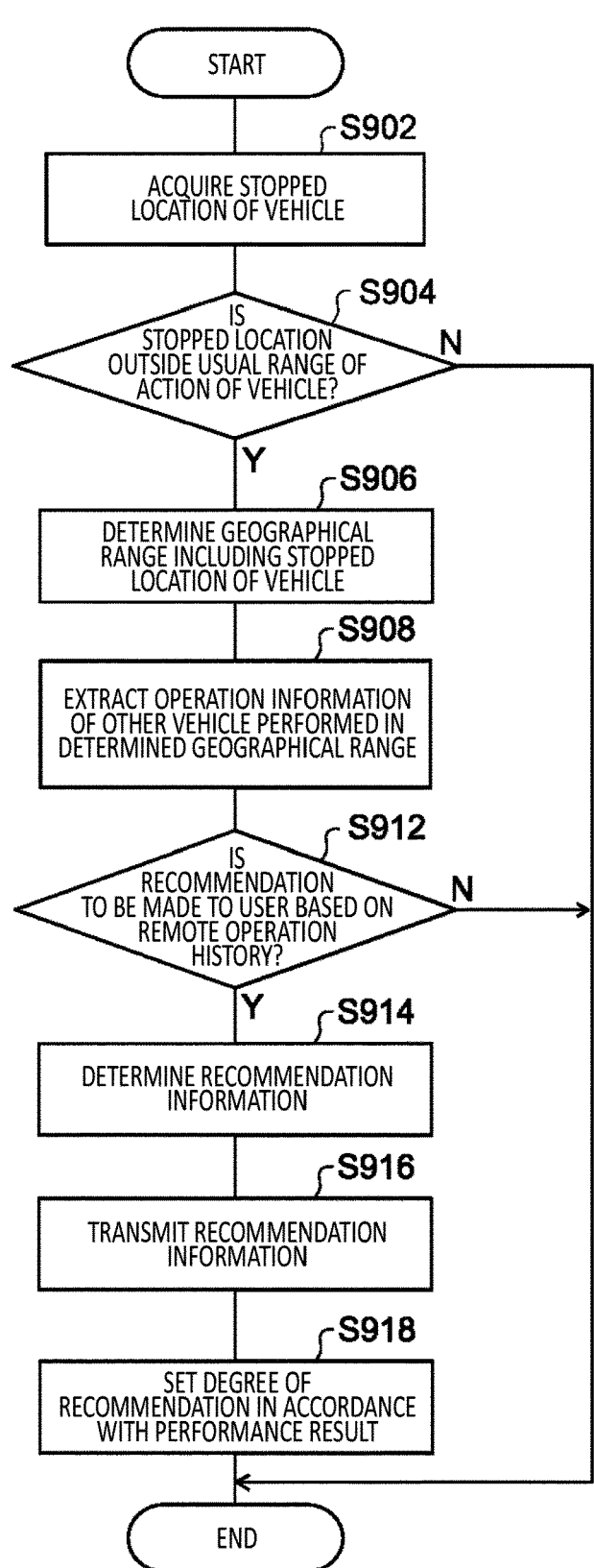
FIG. 9 shows an exemplary flowchart pertaining to a vehicle remote control method performed by the vehicle remote operation apparatus 100.

FIG. 9 shows an exemplary flowchart pertaining to a vehicle remote control method performed by the vehicle remote operation apparatus 100. The processing of FIG. 9 may be performed when the vehicle 10 is stopped or at a predetermined timing determined by the action plan of the user 90 of the vehicle 10.

In S902, the location acquisition unit 210 acquires the stopped location of the vehicle 10. In S904, the recommendation information determination unit 230 determines whether the stopped location of the vehicle 10 is outside the usual range of action. For example, the recommendation information determination unit 230 determines whether it is outside the usage area set by the usage area setting unit 260. The usage area setting unit 260 sets, based on the vehicle usage history information, the predetermined geographical range that includes the location where the vehicle 10 has passed more frequently than the predetermined number of times in the predetermined period, to be the usage area in which the vehicle 10 is mainly used.

In S904, if the stopped location of the vehicle 10 is determined not to be outside the usual range of action of the vehicle 10, the vehicle remote operation apparatus 100 ends the processing of this flowchart. In S904, if the stopped location of the vehicle 10 is determined to be outside the usual range of action of the vehicle 10, the recommendation information determination unit 230 determines in S906 the predetermined geographical range that includes the stopped location of the vehicle 10. Then, in S908, the recommendation information determination unit 230 refers to the remote operation history information to extract the operation information of the operation that has been performed in other vehicle 10 in the geographical range determined in S906. In doing so, as described in connection with FIG. 8 and the like, the recommendation information determination unit 230 may extract the operation information of the operation that has been performed in other vehicle 10 in the environmental information that matches the internal and/or external environmental information of the vehicle 10. Furthermore, the recommendation information determination unit 230 may extract the operation information of the operation that has been performed in the past in other vehicle 10 having the functional information that matches the functional information of the vehicle 10.

In S912, the recommendation information determination unit 230 determines whether to make a recommendation to the user 90 based on the remote operation history. For example, if the internal and external environmental information of the vehicle 10 in a predetermined timing determined from the action plan of the user 90 of the vehicle 10 satisfies the predetermined condition, the recommendation information determination unit 230 determines to make a recommendation to the user 90 based on the remote operation history.

In S912, if the recommendation information determination unit 230 determines not to make a recommendation to the user based on the remote operation history, the vehicle remote operation apparatus 100 ends the processing of this flowchart. If the recommendation information determination unit 230 determines to make a recommendation to the user 90 in S912 based on the remote operation history, it determines the recommendation information in S914. Specifically, as described in connection with FIG. 8, the recommendation information determination unit 230 refers to the remote operation history information, and extracts the operation information of the operation that has been performed in response to the remote operation request in the past in the predetermined geographical range including the stopped location of the vehicle 10 taking into account the internal and/or external environmental information of the vehicle 10 and/or the functional information of the vehicle 10, to determine the recommendation information based on the extracted operation information.

In S916, the transmission unit 284 transmits, to the user terminal 92, the recommendation information determined in S914 by the recommendation information determination unit 230. In S918, the recommendation information determination unit 230 sets the degree of recommendation in the remote operation history information in accordance with the performance result in the vehicle 10. For example, if the remote operation request requesting to perform the recommended operation is received from the user terminal 92 as well as the signal indicating that the operation has been performed is received from the vehicle 10 after the transmission of the operation instruction to the vehicle 10, the recommendation information determination unit 230 increases the degree of recommendation that is correspondingly related to the operation information for the operation that has been instructed to and performed in the vehicle 10. Contrarily, if the remote operation request requesting to perform the recommended operation is not received from the user terminal 92, the recommendation information determination unit 230 decrease the degree of recommendation that is correspondingly related to the operation information for the recommended operation.

In the embodiments described above, the explanation is made about the configuration in which the communication device 280 communicates with the vehicle remote operation apparatus 100 by radio communication such as the mobile communication network. However, if the vehicle 10 is an electric vehicle, the vehicle 10 may transmits information to the vehicle remote operation apparatus 100 through a charging apparatus when the vehicle 10 is connected to the charging apparatus. By doing so, the vehicle 10 can decrease the amount of communication performed through the mobile communication network. If the vehicle remote operation apparatus 100 receives the information from the vehicle 10 through the charging apparatus, it may apply the preliminarily registered location information of the charging apparatus to the location information of the vehicle 10. By doing so, the accuracy of the location information of the vehicle 10 can be prevented from being influenced by the location detection error which is based on the signals from the GNSS satellite.

The vehicle 10 in the embodiments described above is one example of a movable object. Any other transportation machinery other than a vehicle can be applied as the movable object.

Figure 10:
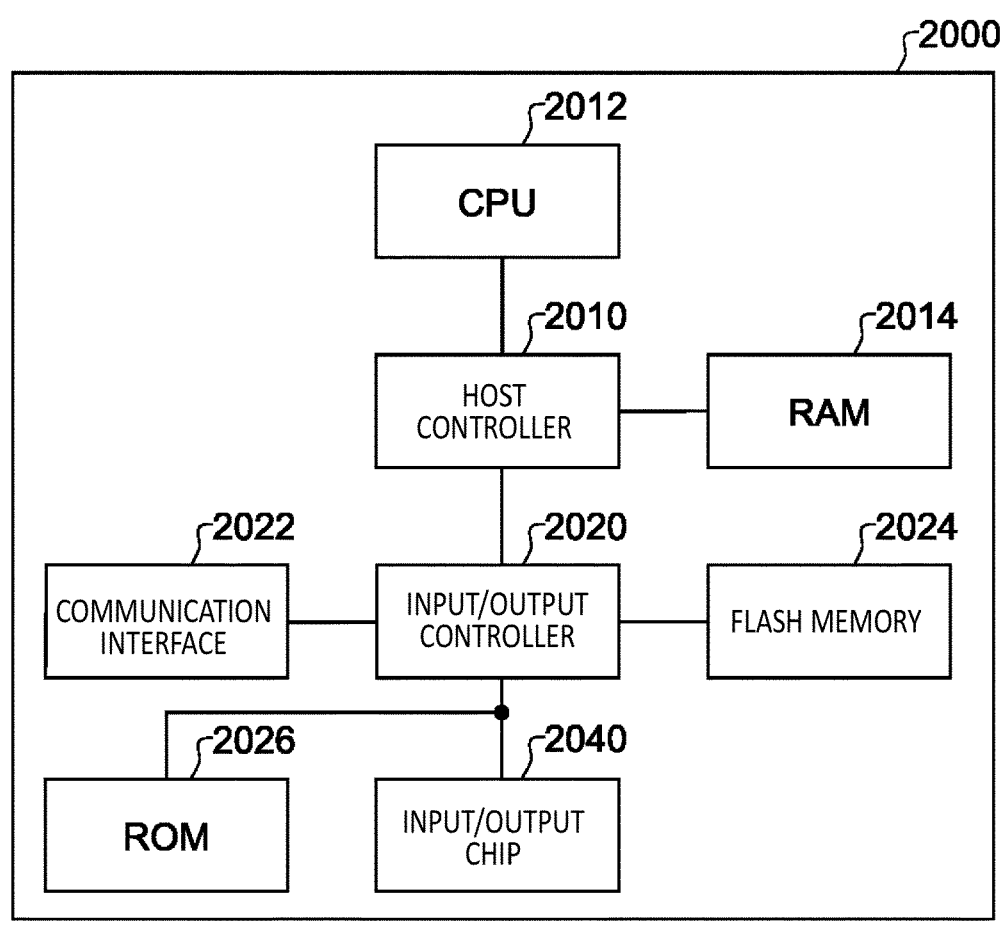
FIG. 10 shows an example of a computer 2000.

FIG. 10 shows an example of a computer 2000 in which a plurality of embodiments of the present invention may be entirely or partially embodied. The program installed in the computer 2000 can cause the computer 2000 to function as each unit in the vehicle remote operation system 5 or an apparatus such as the vehicle remote operation apparatus 100 or each unit in such an apparatus pertaining to the embodiments, to perform operations associated with such a system or each unit in such a system or such an apparatus or each unit in such an apparatus, and/or to perform a process or steps in such a process pertaining to the embodiments. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, and thereby controls each unit.

The communication interface 2022 communicates with another electronic device via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, a HDMI (registered trademark) port.

A program is provided via a network or a computer readable storage medium such as a CD-ROM, a DVD-ROM, or a memory card. The RAM 2014, the ROM 2026, or the flash memory 2024 is an example of the computer readable storage medium. The program is installed in the flash memory 2024, the RAM 2014, or the ROM 2026, and executed by the CPU 2012. Information processing written in these programs is read by the computer 2000, and provides cooperation between the programs and the various types of hardware resources described above. An apparatus or a method may be actualized by executing operations or processing of information depending on a use of the computer 2000.

For example, when a communication is executed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and execute various kinds of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various kinds of processing including various kinds of operations, information processing, conditional judgement, conditional branching, unconditional branching, information retrieval/replacement, or the like described herein and specified by instruction sequences of the programs, and write back a result into the RAM 2014. In addition, the CPU 2012 may retrieve information in a file, a database, or the like in the recording medium. For example, when multiple entries each having an attribute value of a first attribute associated with an attribute value of a second attribute, is stored in the recording medium, the CPU 2012 may retrieve an entry having a designated attribute value of the first attribute that matches a condition from these multiple entries, and read the attribute value of the second attribute stored in this entry, thereby obtaining the attribute value of the second attribute associated with the first attribute that satisfies a predetermined condition.

The programs or software modules described above may be stored in the computer readable storage medium on the computer 2000 or in the vicinity of the computer 2000. A recording medium such as a hard disk or a RAM provided in a server system connected to a dedicated communication network or the Internet can be used as the computer readable storage medium. A program stored in the computer readable storage medium may be provided to the computer 2000 via a network.

The program that is installed in the computer 2000 and causes the computer 2000 to function as the vehicle remote operation apparatus 100 may work on the CPU 2012 or the like to cause the computer 2000 to distinctively function as each unit of the vehicle remote operation apparatus 100. By the information processing described in such a program being loaded into the computer 2000, the information processing functions as each unit in the vehicle remote operation apparatus 100 that is a specific means obtained by a combination of software and the above-described hardware. These specific means implement operations or processing of information according to the intended use of the computer 2000 in the present embodiment, and the vehicle remote operation apparatus 100 is thereby constructed to be specific for the intended use.

Various embodiments have been described with reference to the block diagrams and the like. In the block diagrams, each block may represent (1) a stage of a process in which an operation is executed, or (2) each unit of the apparatus having a role in executing the operation. A specific stage and each unit may be implemented by a dedicated circuit, a programmable circuit supplied with computer-readable instructions stored on a computer readable storage medium, and/or a processor supplied with computer-readable instructions stored on a computer readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and another logical operation, and a memory element such as a flip-flop, a register, a field programmable gate array (FPGA), a programmable logic array (PLA), or the like.

The computer readable storage medium may include any tangible device capable of storing instructions to be executed by an appropriate device. Thereby, the computer readable storage medium having instructions stored therein forms at least a part of a product including instructions which can be executed to provide means for executing processing procedures or operations specified in the block diagrams. Examples of the computer readable storage medium may include an electronic storage medium, a magnetic storage medium, an optical storage medium, an electromagnetic storage medium, a semiconductor storage medium, and the like. More specific examples of the computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disc (DVD), a Blu-ray (registered trademark) disc, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, a special purpose computer, or another programmable data processing device, or to programmable circuit, locally or via a local area network (LAN), wide area network (WAN) such as the Internet, and a computer-readable instruction may be executed to provide means for executing operations specified in the described processing procedures or block diagrams. An example of the processor includes a computer processor, processing unit, microprocessor, digital signal processor, controller, microcontroller, or the like.

While the present invention has been described with the embodiments, the technical scope of the present invention is not limited to the above-described embodiments. It is apparent to persons skilled in the art that various alterations or improvements can be added to the above-described embodiments. It is also apparent from description of the claims that embodiments to which such alterations or improvements are made can be included in the technical scope of the present invention.

Each process of the operations, procedures, steps, and stages etc. in the apparatus, system, program, and method shown in the claims, specification, or diagrams can be executed in any order as long as the order is not indicated by "prior to", "before", or the like and as long as the output from a previous process is not used in a later process. Even if the operational flow is described using phrases such as "first" or "next" for the sake of convenience in the claims, specification, or drawings, it does not necessarily mean that the processing must be performed in this order.

EXPLANATION OF REFERENCES

5: vehicle remote operation system;
10: vehicle;
90: user;
92: user terminal;
100: vehicle remote operation apparatus;
200: processing device;
210: location acquisition unit;
220: remote operation unit;
230: recommendation information determination unit
240: action plan acquisition unit;
250: functional information acquisition unit;
260: usage area setting unit;
270: environmental information acquisition unit;
280: communication device;
282: reception unit;
284: transmission unit;
290: storage device;
2000: computer;
2010: host controller;
2012: CPU;
2014: RAM;
2020: input/output controller;
2022: communication interface;
2024: flash memory;
2026: ROM;
2040: input/output chip.

What is claimed is:

1. A vehicle remote operation apparatus, comprising:
a location acquisition unit which acquires location information indicating a location of a vehicle;
a remote operation unit which, in response to a remote operation request from a user terminal associated with the vehicle, causes the vehicle to perform an operation requested by the remote operation request;
a transmission unit which, when the location acquisition unit acquires a location information of a first vehicle, transmits, to a user terminal associated with the first vehicle, information related to an operation of a second vehicle that has been performed in response to a remote operation request from a user terminal associated with the second vehicle in a predetermined range including a location of the first vehicle; and
an action plan acquisition unit which acquires an action plan of a user of the first vehicle, wherein
the location acquisition unit acquires location information indicating a stopped location of the vehicle,
when the vehicle is stopped, the remote operation unit causes the vehicle to perform an operation requested by a remote operation request received from the user terminal, and
the predetermined range is determined according to the action plan.

2. The vehicle remote operation apparatus according to claim 1, wherein
when the location acquisition unit acquires location information of the first vehicle, the transmission unit transmits, to a user terminal associated with the first vehicle, information related to operations of a plurality of second vehicles, each being identical to the second vehicle, that have been performed in response to a plurality of remote operation requests, each being identical to the remote operation request, in a predetermined period before the first vehicle is stopped as well as in a predetermined range including a stopped location of the first vehicle.

3. The vehicle remote operation apparatus according to claim 2, further comprising:
an environmental information acquisition unit which acquires environmental information indicating an environment in a location of the vehicle, wherein
the transmission unit transmits, to a user terminal associated with the first vehicle, information related to an operation of the second vehicle that has been performed in response to the remote operation request in an environment related to the environmental information at a time related to the action plan and at a location of the first vehicle as well as in a predetermined range including a stopped location of the first vehicle.

4. The vehicle remote operation apparatus according to claim 2, further comprising:
a functional information acquisition unit which acquires functional information indicating a function included in the vehicle, wherein
the transmission unit transmits, to a user terminal associated with the first vehicle, information related to an operation of the second vehicle which includes a function related to the function included in the first vehicle, that has been performed in response to the remote operation request in a predetermined range including a stopped location of the first vehicle.

5. The vehicle remote operation apparatus according to claim 2, further comprising:
a usage area setting unit which sets a usage area in which the first vehicle is mainly used, based on a usage history including location information of the first vehicle in a predetermined period and a frequency of the first vehicle being present in a location indicated by the location information, wherein
when the location acquisition unit acquires location information of the first vehicle, on condition that a location indicated by the location information of the first vehicle is outside the usage area, the transmission unit transmits, to a user terminal associated with the first vehicle, information related to an operation of the second vehicle that has been performed in response to a remote operation request from a user terminal associated with the second vehicle in a predetermined range including the location of the first vehicle.

6. The vehicle remote operation apparatus according to claim 1, further comprising:
an environmental information acquisition unit which acquires environmental information indicating an environment in a location of the vehicle, wherein
the transmission unit transmits, to a user terminal associated with the first vehicle, information related to an operation of the second vehicle that has been performed in response to the remote operation request in an environment related to the environmental information at a time related to the action plan and at a location of the first vehicle as well as in a predetermined range including a stopped location of the first vehicle.

7. The vehicle remote operation apparatus according to claim 6, further comprising:

a functional information acquisition unit which acquires functional information indicating a function included in the vehicle, wherein the transmission unit transmits, to a user terminal associated with the first vehicle, information related to an operation of the second vehicle which includes a function related to the function included in the first vehicle, that has been performed in response to the remote operation request in a predetermined range including a stopped location of the first vehicle.

8. The vehicle remote operation apparatus according to claim 1, further comprising:

a functional information acquisition unit which acquires functional information indicating a function included in the vehicle, wherein the transmission unit transmits, to a user terminal associated with the first vehicle, information related to an operation of the second vehicle which includes a function related to the function included in the first vehicle, that has been performed in response to the remote operation request in a predetermined range including a stopped location of the first vehicle.

9. The vehicle remote operation apparatus according to claim 1, further comprising:

a usage area setting unit which sets a usage area in which the first vehicle is mainly used, based on a usage history including location information of the first vehicle in a predetermined period and a frequency of the first vehicle being present at a location indicated by the location information, wherein when the location acquisition unit acquires location information of the first vehicle, on condition that a location indicated by the location information of the first vehicle is outside the usage area, the transmission unit transmits, to a user terminal associated with the first vehicle, information related to an operation of the second vehicle that has been performed in response to a remote operation request from a user terminal associated with the second vehicle in a predetermined range including the location of the first vehicle.

10. A vehicle remote operation method, comprising:

acquiring location information indicating a location of a vehicle;

in response to a remote operation request from a user terminal associated with the vehicle, causing the vehicle to perform an operation requested by the remote operation request;

when a location information of a first vehicle is acquired, transmitting, to a user terminal associated with the first vehicle, information related to an operation of a second vehicle that has been performed in response to a remote operation request from a user terminal associated with the second vehicle in a predetermined range including a location of the first vehicle;

acquiring an action plan of a user of the first vehicle;

acquiring location information indicating a stopped location of the vehicle; and when the vehicle is stopped, causing the vehicle to perform an operation requested by a remote operation request received from the user terminal, wherein the predetermined range is determined according to the action plan.

11. A non-transitory computer readable storage medium which stores program therein, the program causes a computer to function as a location acquisition unit which acquires location information indicating a location of a vehicle;

a remote operation unit which, in response to a remote operation request from a user terminal associated with the vehicle, causes the vehicle to perform an operation requested by the remote operation request;

a transmission unit which, when the location acquisition unit acquires a location information of a first vehicle, transmits, to a user terminal associated with the first vehicle, information related to an operation of a second vehicle that has been performed in response to a remote operation request from a user terminal associated with the second vehicle in a predetermined range including a location of the first vehicle; and an action plan acquisition unit which acquires an action plan of a user of the first vehicle, wherein the location acquisition unit acquires location information indicating a stopped location of the vehicle, when the vehicle is stopped, the remote operation unit causes the vehicle to perform an operation requested by a remote operation request received from the user terminal, and the predetermined range is determined according to the action plan.

* * * * *